United States Patent
Sano

(10) Patent No.: US 6,411,813 B1
(45) Date of Patent: Jun. 25, 2002

(54) DATA COMMUNICATION METHOD AND APPARATUS

(75) Inventor: Shinya Sano, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/354,373

(22) Filed: Jul. 14, 1999

(30) Foreign Application Priority Data

Jul. 15, 1998 (JP) .......................................... 10-199394

(51) Int. Cl.[7] ................................................ H04Q 7/20
(52) U.S. Cl. ........................ 455/466; 455/574; 370/338
(58) Field of Search .............................. 455/574, 556, 455/41, 557, 466; 359/118, 143; 340/3.4; 370/338

(56) References Cited

U.S. PATENT DOCUMENTS

| | | | | |
|---|---|---|---|---|
| 5,752,201 A | * | 5/1998 | Kivari ......................... | 455/343 |
| 5,752,202 A | * | 5/1998 | Obright ...................... | 340/7.34 |
| 6,243,579 B1 | * | 6/2001 | Kari ............................ | 370/320 |

FOREIGN PATENT DOCUMENTS

| | | |
|---|---|---|
| GB | 2307834 A | 6/1997 |
| GB | 2314745 A | 1/1998 |

* cited by examiner

*Primary Examiner*—Daniel Hunter
*Assistant Examiner*—Nick Corsaro
(74) *Attorney, Agent, or Firm*—Scully, Scott, Murphy & Presser

(57) ABSTRACT

A data communication method in a mobile device alternately performing an online operation and an offline operation is disclosed. Connection communication with the specific station is allowed after a connection to the specific station has been established through the online operation and non-connection communication with any other station is allowed in the offline operation. When a connection communication request occurs during the offline operation, the online operation for the connection communication is started in response to the connection communication request. When a non-connection communication request occurs during the online operation, the offline operation for the non-connection communication is started in response to the non-connection communication request.

16 Claims, 12 Drawing Sheets

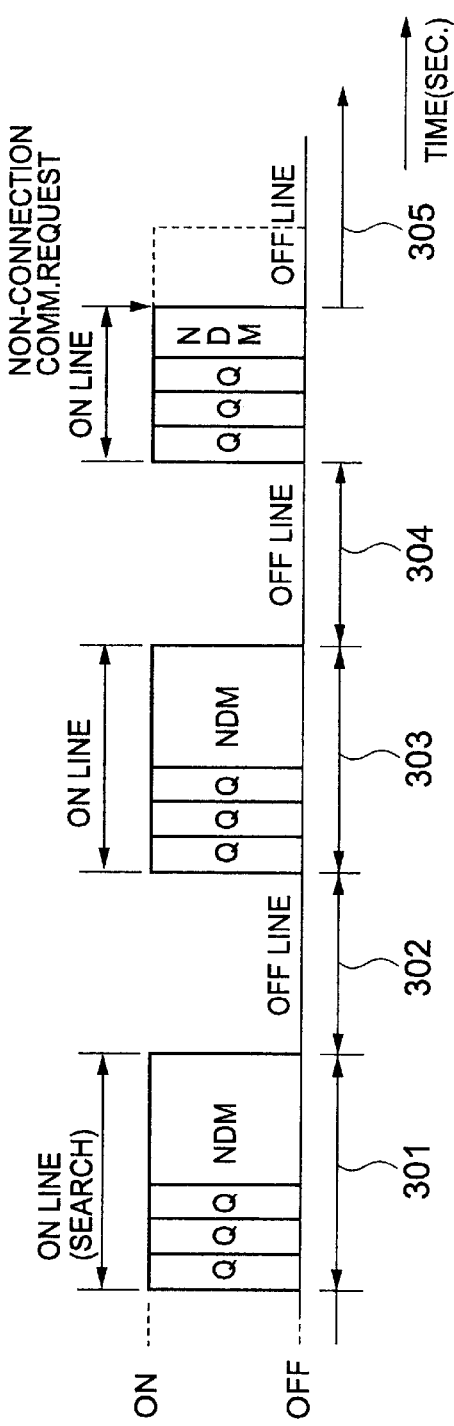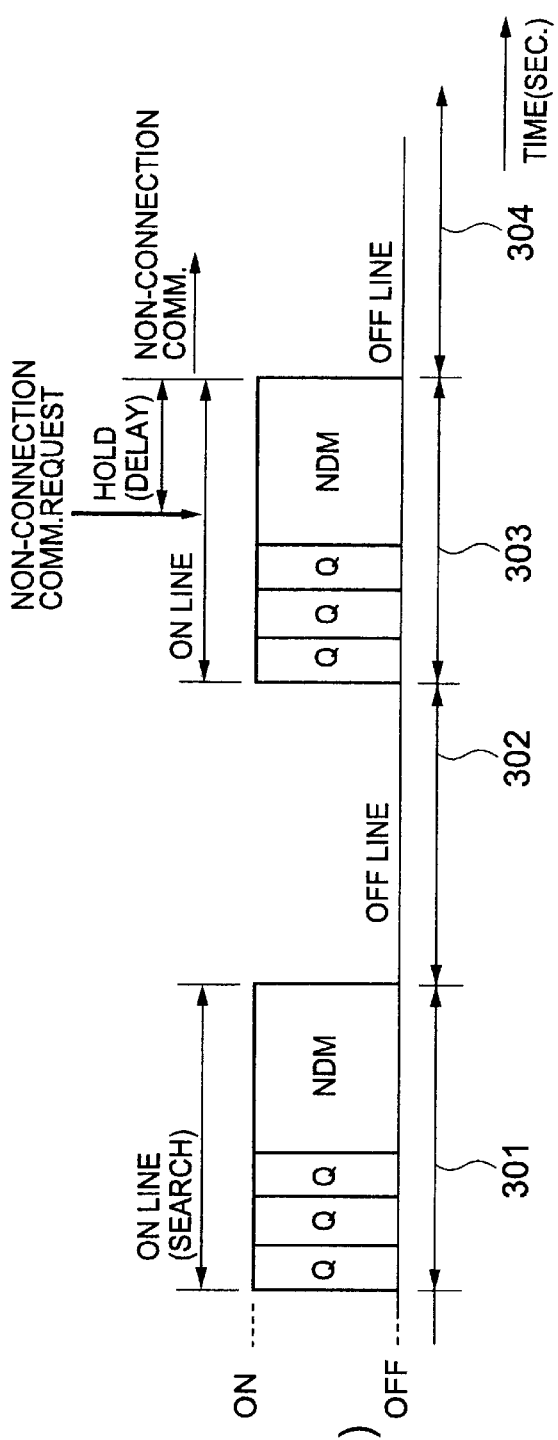
FIG.3A
FIG.3B (PRIOR ART)

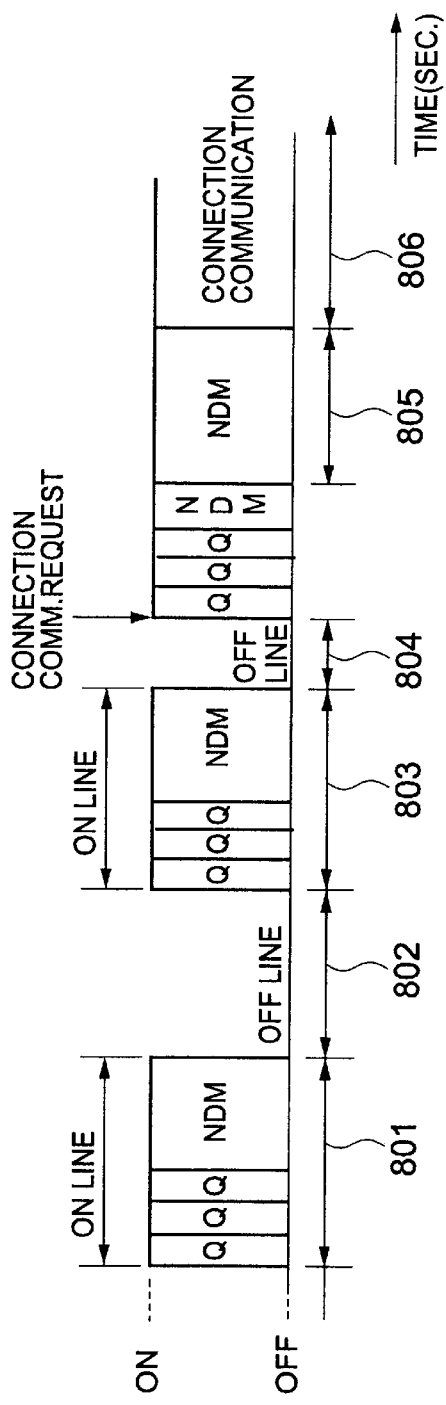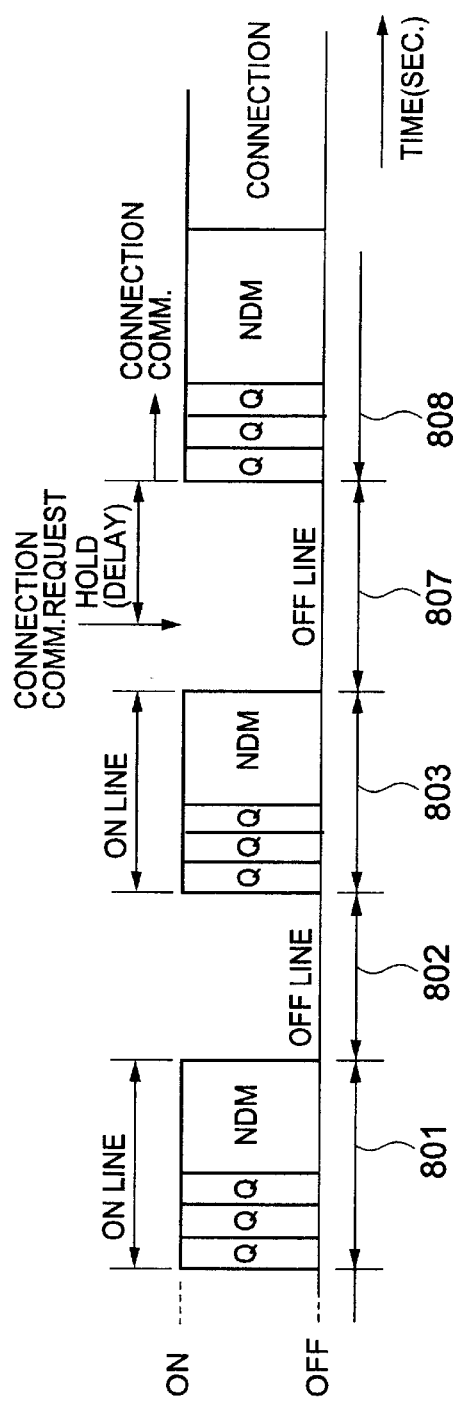

DATA COMMUNICATION METHOD AND APPARATUS

BACKGROUND OF THE INVENTION

1. Field of the Invention

The present invention generally relates to data communications techniques and in particular to data communications method and apparatus for transmitting and receiving data according to connection and non-connection data communication protocols.

2. Description of the Related Art

As a communication protocol, connection and non-connection communication protocols have been known. In the connection communication protocol, one party identifies another party to communicate with before communicating with the identified party, which is called "Connection Write" in the IrMC (Infrared Mobile Communications) standard (see "Telecom Specification"). The IrMC standard has been introduced by the Infrared Data Association (IrDA), defining common data exchange formats and protocols for interoperability in mobile communications devices such as a mobile telephone, a mobile personal computer, and the like. In the non-connection communication protocol, on the other hand, the one party transmits data to another party in only one direction without identifying the destination, which is called "Ultra Write" in the IrMC standard.

A mobile communication device having the infrared communication function as mentioned above alternately performs ON-LINE operation (search mode) and OFF-LINE operation (off mode) in a predetermined period.

According to the non-connection communication protocol, however, the non-connection communication cannot be performed during the ON-LINE operation. Therefore, as shown in FIG. 3B, when a non-connection communication request occurs during the ON-LINE operation, an error state is generated and thereby the non-connection communication is not permitted until the ON-LINE operation has been completed.

Similarly, according to the connection communication protocol, the connection communication cannot be performed during the OFF-LINE operation. Therefore, as shown in FIG. 8B, when a connection communication request occurs during the OFF-LINE operation, an error state is generated and thereby the connection communication is not permitted until the OFF-LINE operation has been completed.

SUMMARY OF THE INVENTION

An object of the present invention is to provide data communication method and apparatus which can promptly respond to requests of connection and non-connection communications.

According to the present invention, a data communication method in a station which alternately performs an online operation and an offline operation, the online operation including a search operation of searching for a specific station to communicate with, wherein connection communication with the specific station is allowed after a connection to the specific station has been established through the online operation and non-connection communication with any other station is allowed in the offline operation, the method comprising the steps of: determining whether a communication request for one of the connection communication and the non-connection communication occurs; halting a corresponding one of the online operation and the offline operation when the communication request occurs; and starting the other one of the online operation and the offline operation so as to allow requested communication.

According to another aspect of the present invention, a data communication apparatus alternately performs an online operation and an offline operation, the online operation including a search operation of searching for a specific communication station to communicate with, wherein connection communication with the specific communication station is allowed after a connection to the specific communication station has been established through the online operation and non-connection communication with any other station is allowed in the offline operation. The data communication apparatus comprising: a transceiver for transmitting and receiving data to and from another communication station; an input device for inputting an instruction; and a communication controller controlling such that when a communication request for one of the connection communication and the non-connection communication occurs, a corresponding one of the online operation and the offline operation is halted and the other one of the online operation and the offline operation is started so as to allow requested communication.

It is preferable that the offline operation is halted and the online operation for the connection communication is started in response to the connection communication request when a connection communication request occurs during the offline operation. It is preferable that the online operation is halted and the offline operation for the non-connection communication is started in response to the non-connection communication request when a non-connection communication request occurs during the online operation.

Further preferably, when a non-connection communication request occurs during the connection communication, the connection communication is disconnected and the offline operation for the non-connection communication is started in response to the non-connection communication request.

Since one of the online operation and the offline operation is halted when the communication request occurs and the other one is started so as to allow requested communication, prompt data communication can be achieved and power consumption is also reduced.

BRIEF DESCRIPTION OF THE DRAWINGS

FIG. 3A is a time chart showing a first embodiment of an infrared communication method according to the present invention;

FIG. 3B is a time chart showing a conventional infrared communication method;

FIG. 8A is a time chart showing a third embodiment of an infrared communication method according to the present invention;

FIG. 8B is a time chart showing a conventional infrared communication method;

DETAILED DESCRIPTION OF THE PREFERRED EMBODIMENTS

Figure 1:
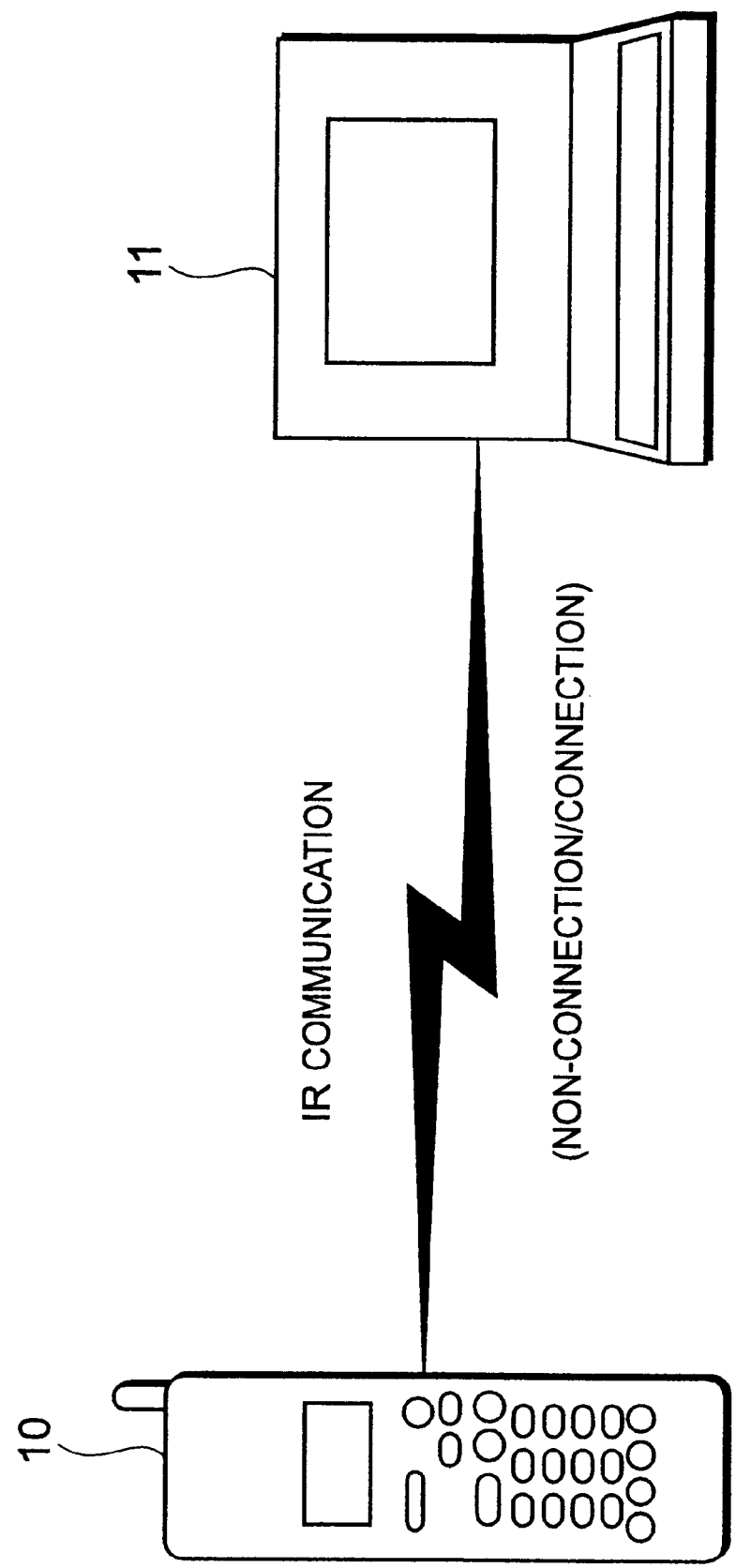
FIG. 1 is a schematic diagram showing an infrared communication system according to the present invention.

Referring to FIG. 1, a mobile telephone 10 and a hand-held personal computer (PC) 11 can communicate with each other by infrared rays according to connection and non-connection communication protocols. Such a mobile device having an infrared communication function is not restricted to the mobile telephone 10 and PC 11. Other mobile devices may be used. Hereinafter, the details of an infrared communications method according to the present invention will be described with reference to the drawings.

Figure 2:
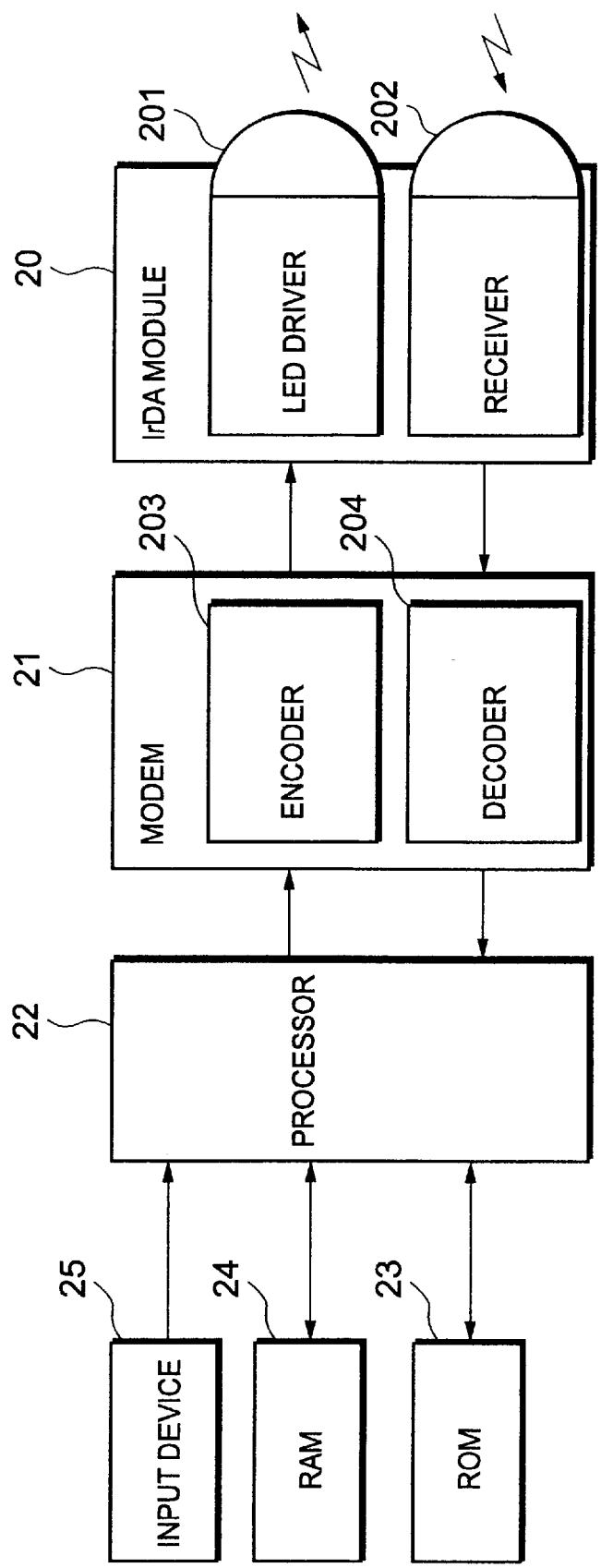
FIG. 2 is a block diagram showing a mobile device used in the infrared communication system according to an embodiment of the present invention.

FIG. 2 shows the internal circuit of a mobile device which may be one of the mobile telephone 10 and the PC 11. The mobile device is provided with an IrDA module 20 for transmitting and receiving an infrared signal. The IrDA module 20 includes an LED connected to an LED driver 201 and a photo detector connected to a receiver 202. The mobile device is further provided with a modem 21 through which the IrDA module 20 is connected to a processor 22. The modem 21 includes an encoder 203 and a decoder 204 which are connected to the LED driver 201 and the receiver 202 of the IrDA module 20, respectively. The IrDA module 20 and the modem 21 are controlled by the processor 22.

The processor 22 may be a program-controlled processor such as CPU on which control programs run to do the entire control of the mobile device. The control programs which are stored in a read-only memory (ROM) 23 include an infrared communication control program according to the present invention. The processor 22 performs the control using a random access memory (RAM) 24 and inputs an instruction from a user through an input device 25 such as a keypad or a pointing device. The communication protocol according to the present invention will be described in detail.

First Embodiment

As shown in FIG. 3A. the processor 22 alternately performs ON-LINE operation (301, 303) and OFF-LINE operation (302, 304) at predetermined intervals. In each ON-LINE operation, the processor 22 produces a query signal Q which is to be transmitted. The query signal Q conveys information of the mobile device itself, for example, Device Nick Name including the IrMC function level of the mobile device itself. Thereafter, the processor 22 changes to a normal discovery mode (NDM) to wait for a response to the query signal Q and, when receiving the response, performs the response protocol control for searching, selecting, and current connection control. In FIG. 3A, ON-LINE operations 301 and 303 indicate that no mobile device to communicate with is found.

Since a non-connection communication request is made by a user, there are cases where the non-connection communication request occurs during an ON-LINE operation. When receiving the non-connection communication request from the input device 25, the processor 22 forces the current ON-LINE operation to be turned off, that is, changes ON-LINE to OFF-LINE. Therefore, a non-connection communication operation 305 can be started immediately after the non-connection communication request occurs.

In contrast, as shown in FIG. 3B, according to the prior art, when a non-connection communication request occurs during the ON-LINE operation 303, the non-connection communication is not permitted until the ON-LINE operation 303 has been completed, resulting in delayed data transmission, for example, a delay of several seconds. According to the embodiment of the present invention, prompt data transmission (for example, a delay of several milliseconds) can be achieved even if the non-connection communication request occurs during the ON-LINE operation 303.

Figure 4:
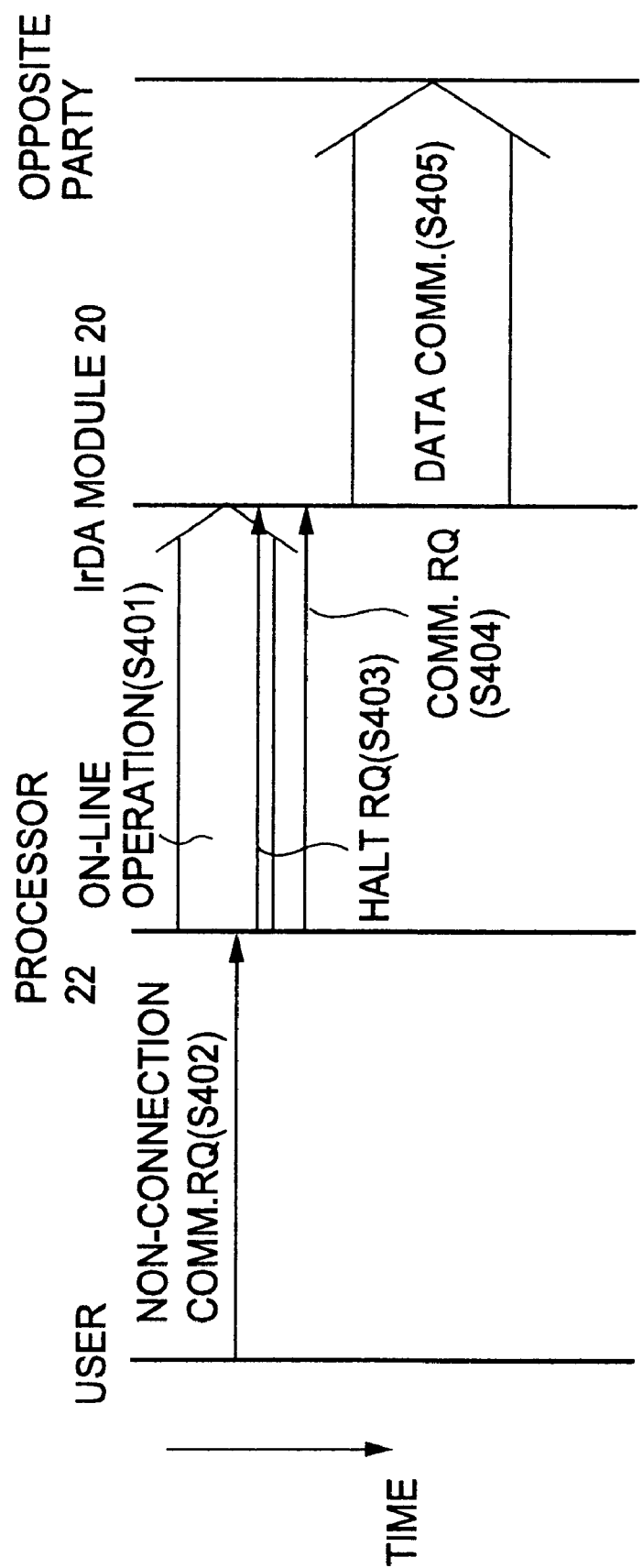
FIG. 4 is a sequence diagram showing an operation of the first embodiment as shown in FIG. 3A.

Referring to FIG. 4, more specifically, assuming that the ON-LINE operation is being done (S401) and a non-connection communication request is made by a user (S402). When receiving the non-connection communication request from the input device 25, the processor 22 sends a halt request to the IrDA module 20 to stop the search operation (S403). Thereafter, the processor 22 sends a communication request to the IrDA module 20 to start the non-connection communication (S404, S405).

Figure 5:
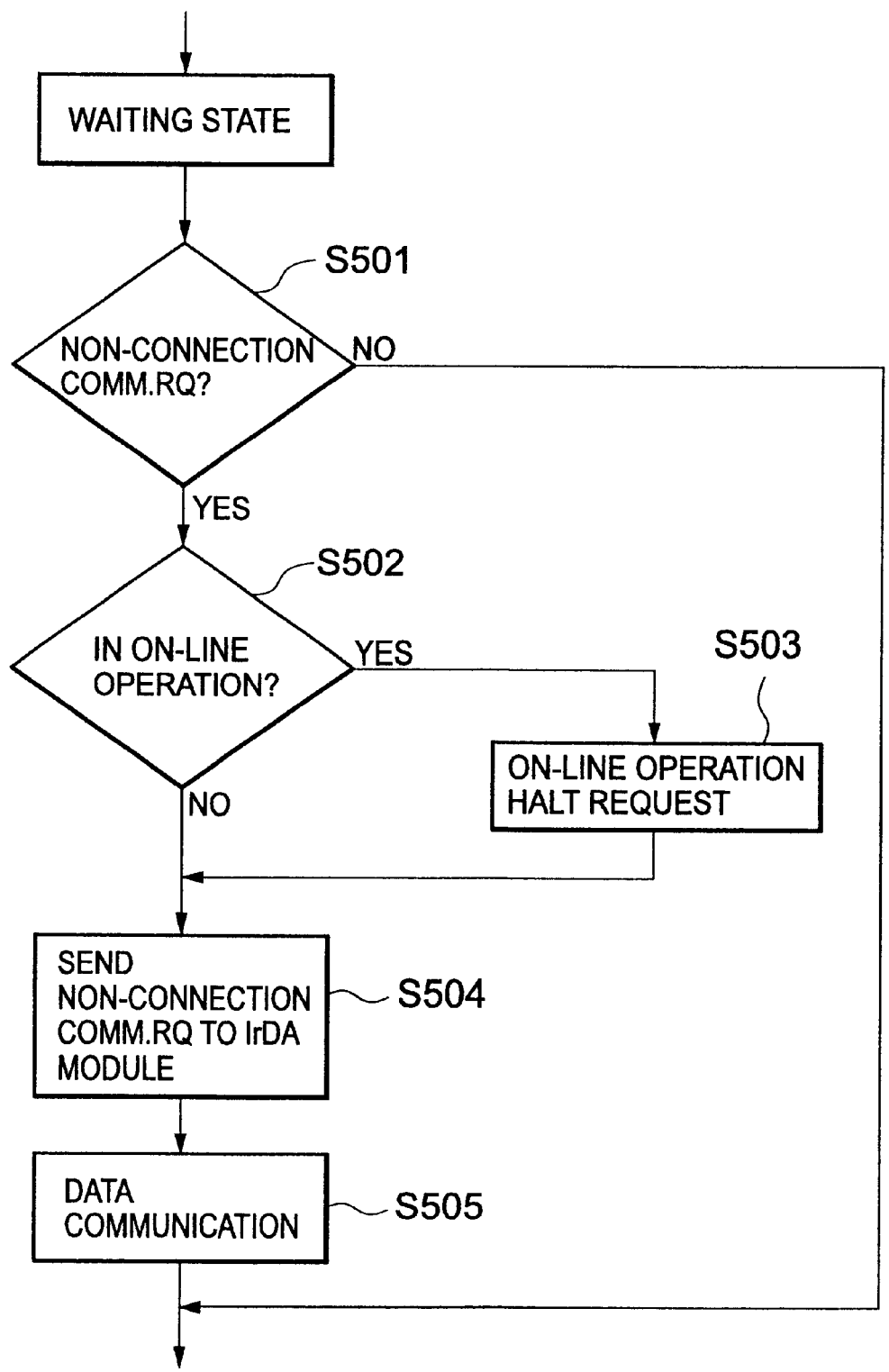
FIG. 5 is a flow chart showing a control operation of a processor in the mobile device according to the first embodiment.

Referring to FIG. 5, the processor 22 performs the communication protocol control when a non-connection communication request occurs. In the case of waiting state, the processor 22 checks whether a non-connection communication request is received from the input device 25 (step S501). When receiving the non-connection communication request (YES in step S501), it is further checked whether the ON-LINE operation is being done (step S502). When in ON-LINE operation (YES in step S502), the processor 22 sends an ON-LINE operation halt request to the IrDA module 20 (step S503). When in OFF-LINE operation (NO in step S502) or after the ON-LINE operation halt request has been sent to the IrDA module 20 (step S503), the processor 22 sends a non-connection communication request to the IrDA module 20 (step S504) and then the non-connection data communication is started (step S505). When the non-connection data communication has been completed, the processor 22 is changed to the waiting mode. In this way, the non-connection communication control is performed as shown in FIG. 3A.

Second Embodiment

In the case where a non-connection communication request occurs in a state of communicating with a specific mobile device through an established connection, the following control is performed.

Figure 6:
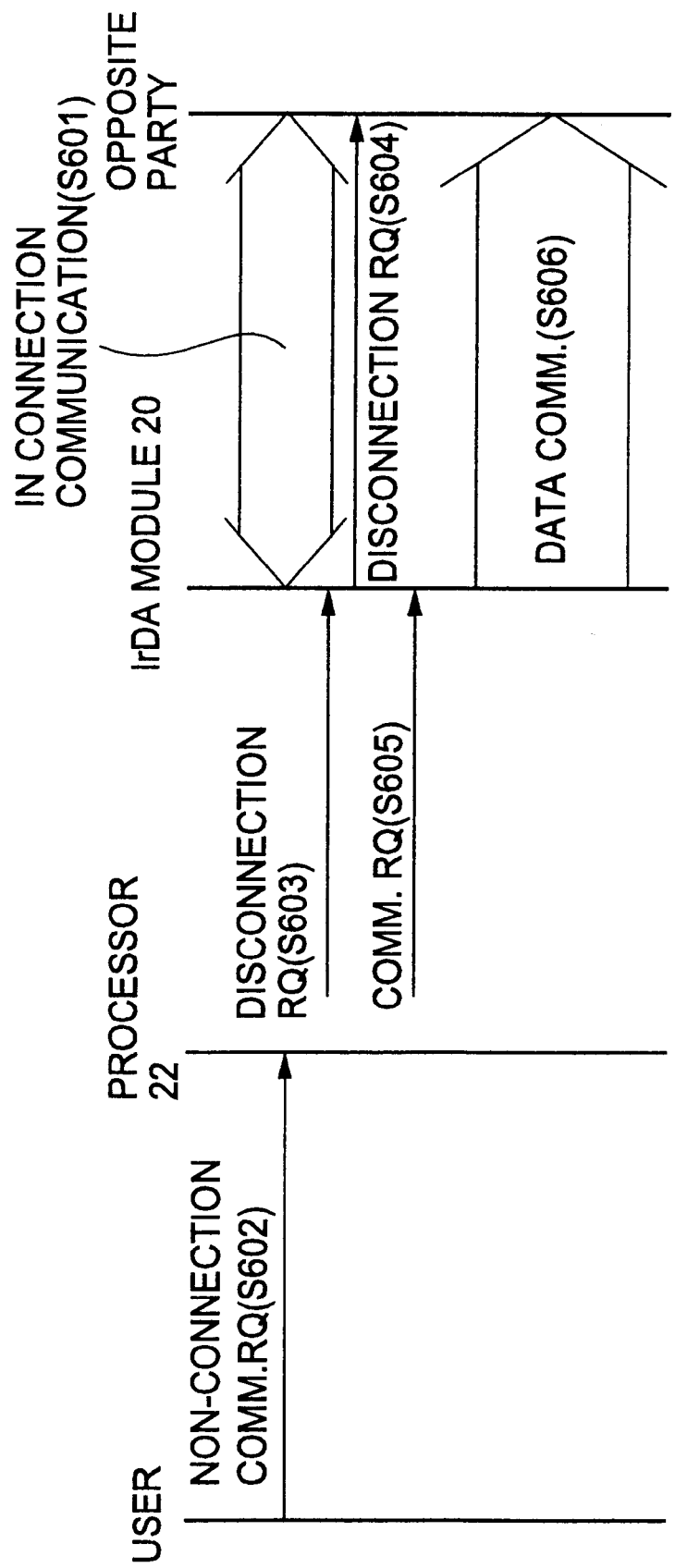
FIG. 6 is a sequence diagram showing an operation of a second embodiment of an infrared communication method according to the present invention.

Referring to FIG. 6, assuming that the connection communication with the specific mobile device is being done (S601) and a non-connection communication request is made by a user (S602). When receiving the non-connection communication request from the input device 25, the processor 22 sends a disconnection request to the IrDA module 20 (S603). When receiving the disconnection request from the processor 22, the IrDA module 20 transmits the disconnection request to the opposite party (S604). After the connection to the opposite party has been disconnected, the processor 22 sends a communication request to the IrDA module 20 to start the non-connection communication (S605, S606).

Figure 7:
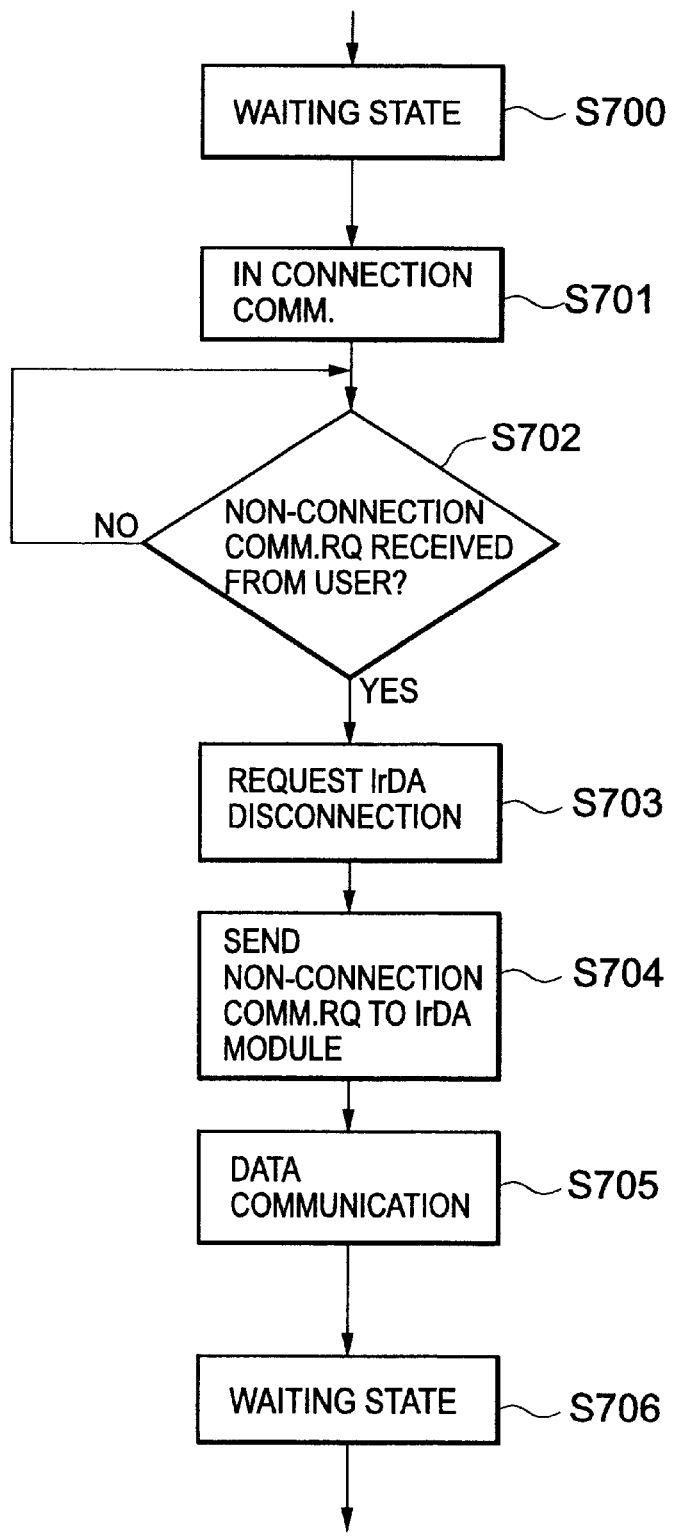
FIG. 7 is a flow chart showing a control operation of a processor in the mobile device according to the second embodiment.

Referring to FIG. 7. the processor 22 performs the communication protocol control when a non-connection communication request occurs. In the case of waiting state (step S700) and doing connection communication (step S701), the processor 22 checks whether a non-connection communication request is received from the input device 25 (step S702). When receiving the non-connection communication request (YES in step S702), the processor 22 sends an IrDA disconnection request to the IrDA module 20 (step S703). Thereafter, the processor 22 sends a non-connection communication request to the IrDA module 20 (step S704) and then the non-connection data communication is started (step S705). When the non-connection data communication has been completed, the processor 22 is changed to the waiting mode (step S706).

Third Embodiment

As shown in FIG. 8A, the processor 22 alternately performs ON-LINE operation (801, 803) and OFF-LINE operation (802) at predetermined intervals. In each ON-LINE operation, the processor 22 produces the query signal Q and thereafter changes its operation mode to the normal discovery mode (NDM). In FIG. 8A. ON-LINE operations 801 and 803 indicate that no mobile device to communicate with is found.

Since a connection communication request is made by a user, there are cases where the connection communication request occurs during an OFF-LINE operation. When receiving the connection communication request from the input device 25, the processor 22 forces the current OFF-LINE operation to be turned on, that is, changes OFF-LINE to ON-LINE. Therefore, a connection communication sequence can be started to establish a connection to the specific mobile device immediately after the connection communication request occurs. When the connection is established in the NDM operation 805, the connection communication 806 is started.

In contrast, as shown in FIG. 8B, according to the prior art, when a connection communication request occurs during the OFF-LINE operation 807, the connection communication is not permitted until the OFF-LINE operation 807 has been completed, resulting in delayed connection communication, for example, a delay of several seconds. According to the embodiment of the present invention, prompt data communication (for example, a delay of several milliseconds) can be achieved even if the connection communication request occurs during the OFF-LINE operation 807.

Figure 9:
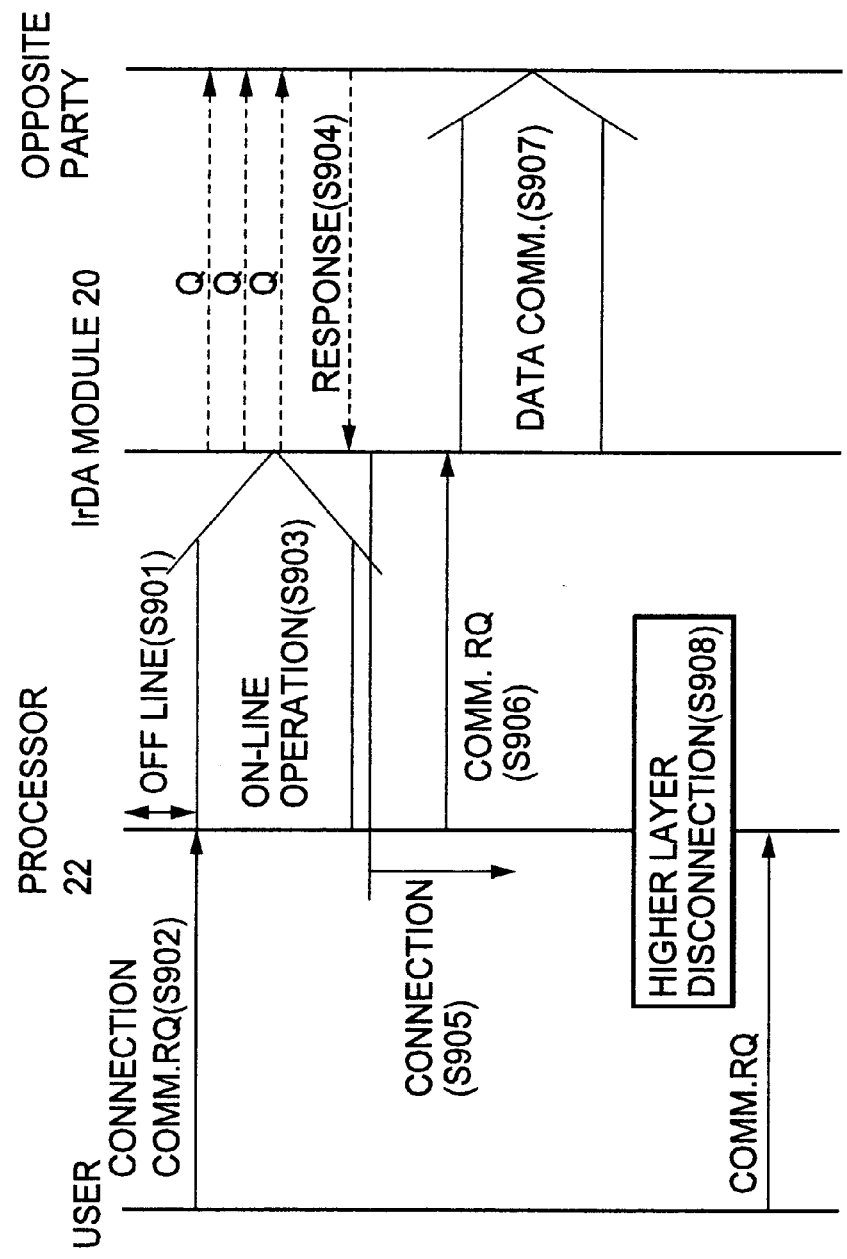
FIG. 9 is a sequence diagram showing an operation of the third embodiment as shown in FIG. 8A.

Referring to FIG. 9, more specifically, assuming that the OFF-LINE operation is being done (S901) and a connection communication request is made by a user (S902). When receiving the connection communication request from the input device 25, the processor 22 starts the ON-LINE operation (S903). When receiving a response to the query signal Q from the opposite mobile device in the ON-LINE operation (S904), the connection to the opposite party is established (S905). Thereafter, the processor 22 sends a communication request to the IrDA module 20 to start the data communication (S906, S907). When the data communication has been completed, the processor 22 performs a higher layer disconnection control (S908).

Figure 10:
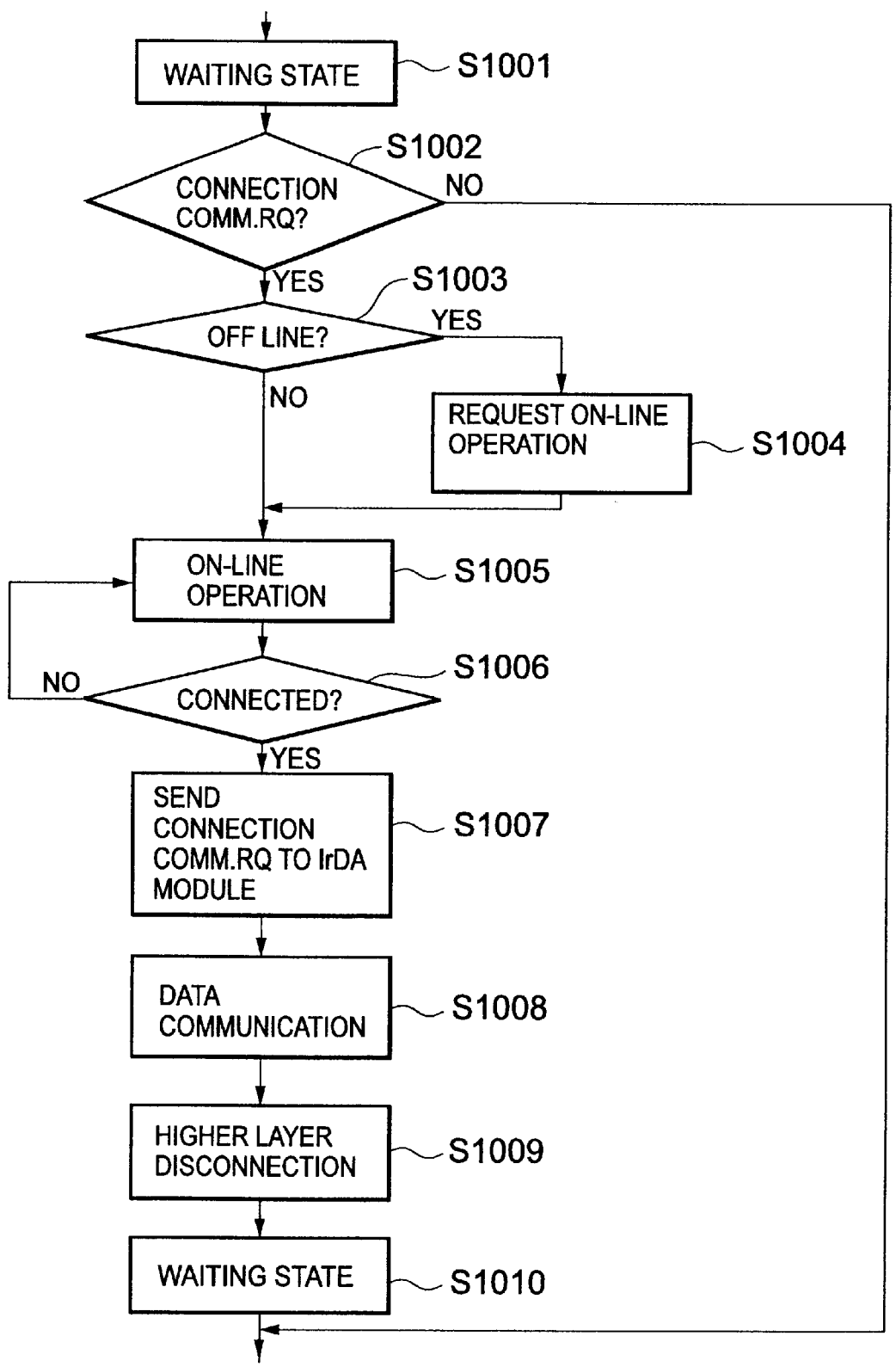
FIG. 10 is a flow chart showing a control operation of a processor in the mobile device according to the third embodiment.

Referring to FIG. 10, in the case of waiting state (step S1001), the processor 22 checks whether a connection communication request is received from the input device 25 (step S1002). When receiving the connection communication request (YES in step S1002), it is further checked whether the OFF-LINE operation is being done (step S1003). When in OFF-LINE operation (YES in step S1003), the processor 22 requests the IrDA module 20 to start an ON-LINE operation (step S1004). When in ON-LINE operation (NO in step S1003) or after the ON-LINE operation request has been sent to the IrDA module 20 (step S1004), the ON-LINE operation is performed until a connection is established (steps S1005 and S1006). More specifically, the connection is established when the IrDA module 20 receives an infrared response signal from the opposite party as a reply to the query signal Q. When the connection to the opposite party has been established (YES in step S1006), the processor 22 sends a communication request to the IrDA module 20 to start the data communication (S1007, S1008). When the data communication has been completed, the processor 22 performs a higher layer disconnection control (S1009) and is then changed to the waiting mode (S1010).

Fourth Embodiment

Figure 11:
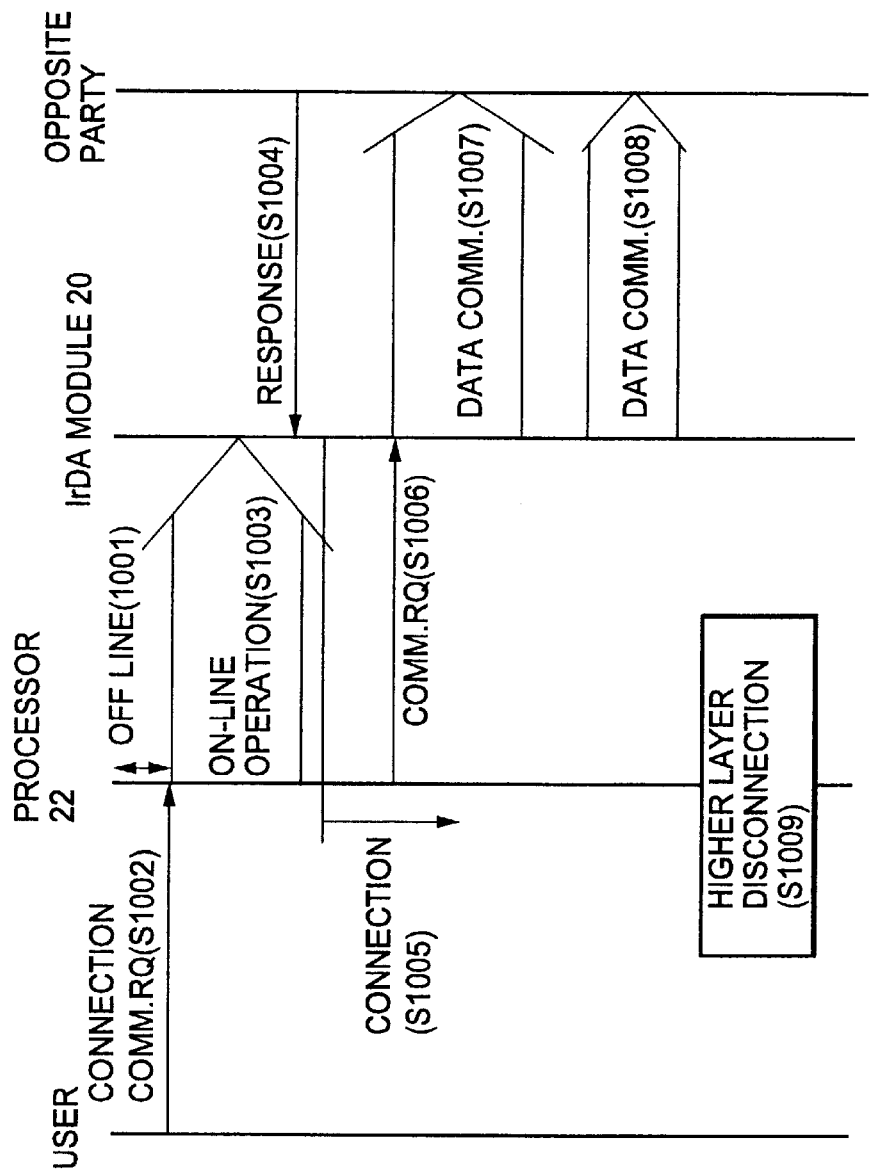
FIG. 11 is a sequence diagram showing an operation of a fourth embodiment of an infrared communication method according to the present invention.

Referring to FIG. 11, assuming that the OFF-LINE operation is being done (S1001) and a connection communication request is made by a user (S1002). When receiving the connection communication request from the input device 25, the processor 22 starts the ON-LINE operation (S1003). When receiving a response to the query signal Q from the opposite mobile device in the ON-LINE operation (S1004), the connection to the opposite party is established (S1005). Thereafter, the processor 22 sends a communication request to the IrDA module 20 to start the data communication (S1006, S1007). If there is next data to be transmitted, then the IrDA module 20 continues the data communication (S1008). When the data communication has been completed, the processor 22 performs a higher layer disconnection control (S1009).

Figure 12:
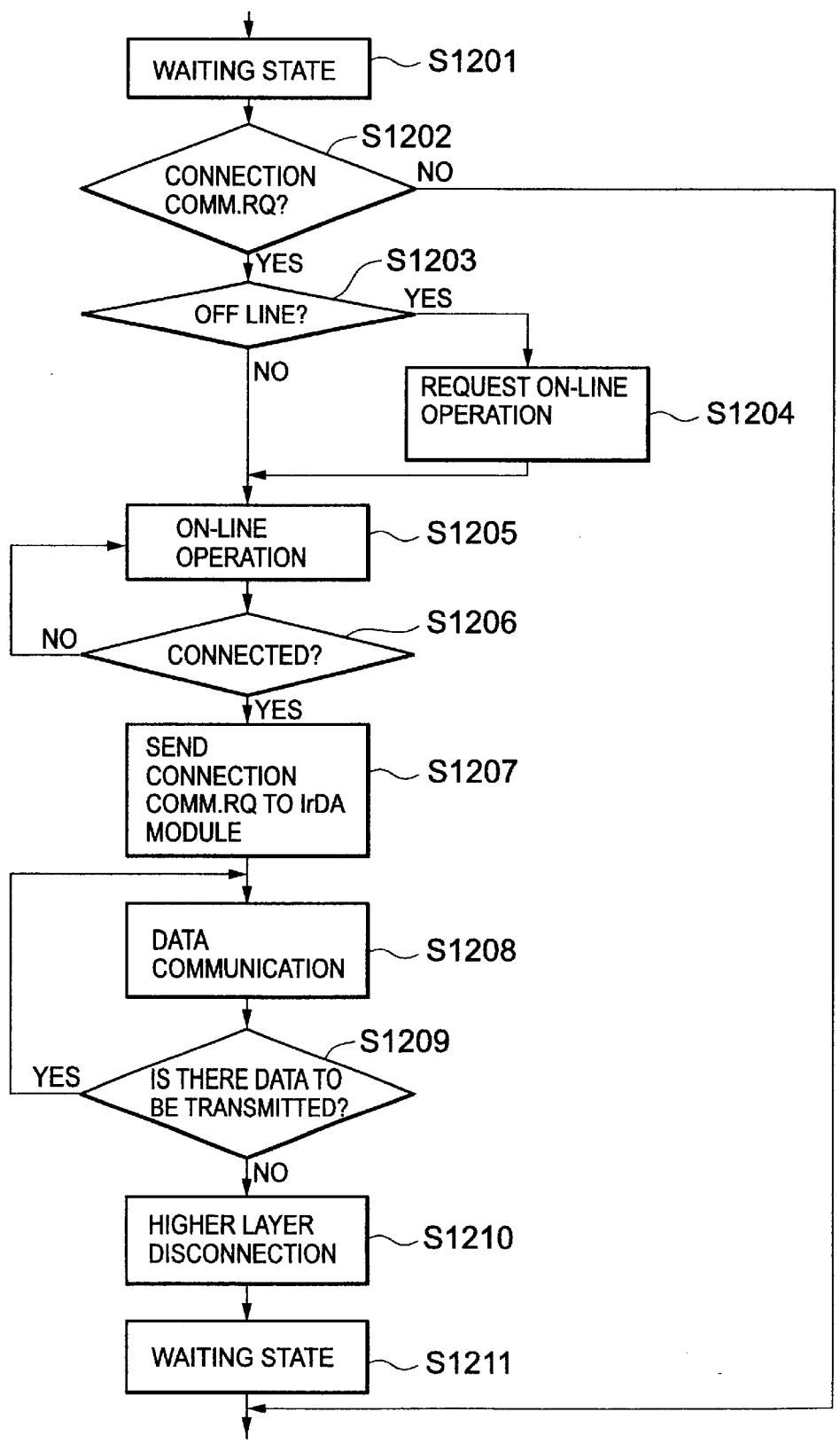
FIG. 12 is a flow chart showing a control operation of a processor in the mobile device according to the fourth embodiment.

Referring to FIG. 12, in the case of waiting state (step S1201), the processor 22 checks whether a connection communication request is received from the input device 25 (step S1202). When receiving the connection communication request (YES in step S1202), it is further checked whether the OFF-LINE operation is being done (step S1203). When in OFF-LINE operation (YES in step S1203), the processor 22 requests the IrDA module 20 to start an ON-LINE operation (step S1204). When in ON-LINE operation (NO in step S1203) or after the ON-LINE operation request has been sent to the IrDA module 20 (step S1204), the ON-LINE operation is performed until a connection is established (steps S1205 and S1206). When the connection to the opposite party has been established (YES in step S1206), the processor 22 sends a communication request to the IrDA module 20 to start the data communication (S1207, S1208).

Thereafter, the processor checks whether there is next data to be processed for transmission (step S1209). If there is next data to be transmitted, then the IrDA module 20 continues the data communication until the data communication has been completed (S1208 and S1209). When the data communication has been completed (NO in step S1209), the processor 22 performs a higher layer disconnection control (S1210) and is then changed to the waiting mode (S1211).

What is claimed is:

1. A data communication method in a station which alternately performs an online operation and an offline operation, the online operation including a search operation of searching for a specific station to communicate with, wherein connection communication with the specific station is allowed after a connection to the specific station has been established through the online operation and non-connection communication with any other station is allowed in the offline operation, the method comprising the steps of:

determining whether a communication request for one of the connection communication and the non-connection communication occurs;

halting a corresponding one of the online operation and the offline operation when the communication request occurs; and starting the other one of the online operation and the offline operation so as to allow requested communication.

2. The data communication method according to claim 1, wherein when a connection communication request occurs during the offline operation, the offline operation is halted and the online operation for the connection communication is started in response to the connection communication request.

3. The data communication method according to claim 1, wherein when a non-connection communication request occurs during the online operation, the online operation is halted and the offline operation for the non-connection communication is started in response to the non-connection communication request.

4. The data communication method according to claim 2, wherein when a non-connection communication request occurs during the online operation, the online operation is halted and the offline operation for the non-connection communication is started in response to the non-connection communication request.

5. The data communication method according to claim 1, wherein when a non-connection communication request occurs during the connection communication, the connection communication is disconnected and the offline operation for the non-connection communication is started in response to the non-connection communication request.

6. The data communication method according to claim 4, wherein when a non-connection communication request occurs during the connection communication, the connection communication is disconnected and the offline operation for the non-connection communication is started in response to the non-connection communication request.

7. The data communication method according to claim 1, wherein the station and the specific station are a mobile communication station having an infrared communication function.

8. The data communication method according to claim 7, wherein the non-connection communication and the connection communication conform to IrMC (Infrared Mobile Communications) standard.

9. A data communication apparatus which alternately performs an online operation and an offline operation, the online operation including a search operation of searching for a specific communication station to communicate with, wherein connection communication with the specific communication station is allowed after a connection to the specific communication station has been established through the online operation and non-connection communication with any other station is allowed in the offline operation, the data communication apparatus comprising:

a transceiver for transmitting and receiving data to and from another communication station;

an input device for inputting an instruction; and a communication controller controlling such that when a communication request for one of the connection communication and the non-connection communication occurs, a corresponding one of the online operation and the offline operation is halted and the other one of the online operation and the offline operation is started so as to allow requested communication.

10. The data communication apparatus according to claim 9, wherein when a connection communication request occurs during the offline operation, the communication controller halts the offline operation and starts the online operation for the connection communication in response to the connection communication request.

11. The data communication apparatus according to claim 9, wherein when a non-connection communication request occurs during the online operation, the communication controller halts the online operation and starts the offline operation for the non-connection communication in response to the non-connection communication request.

12. The data communication apparatus according to claim 10, wherein when a non-connection communication request occurs during the online operation, the communication controller halts the online operation and starts the offline operation for the non-connection communication in response to the non-connection communication request.

13. The data communication method according to claim 9, wherein when a non-connection communication request occurs during the connection communication, the communication controller disconnects the connection communication and starts the offline operation for the non-connection communication in response to the non-connection communication request.

14. The data communication apparatus according to claim 12, wherein when a non-connection communication request occurs during the connection communication, the communication controller disconnects the connection communication and starts the offline operation for the non-connection communication in response to the non-connection communication request.

15. The data communication apparatus according to claim 9, wherein the transceiver is an infrared transceiver wherein the non-connection communication and the connection communication conform to IrMC (Infrared mobile Communications) standard.

16. The data communication apparatus according to claim 10, wherein the communication controller repeatedly performs data transmission in the connection communication until all data to be transmitted have been transmitted.

* * * * *